S. W. KELSEY.
ADJUSTABLE MILKING STOOL.
APPLICATION FILED FEB. 20, 1918.
1,318,288.
Patented Oct. 7, 1919.
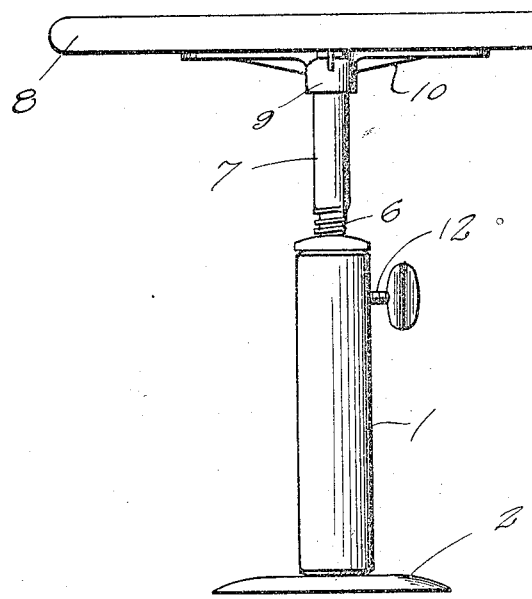
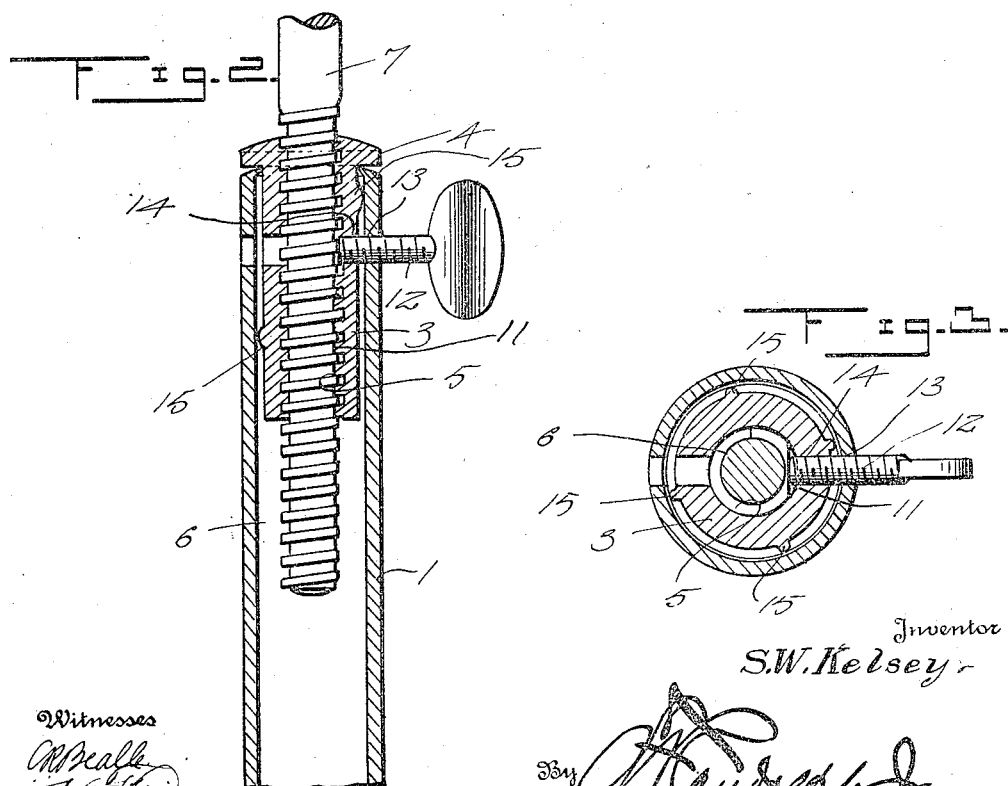
Inventor
S. W. Kelsey

UNITED STATES PATENT OFFICE.

SAMUEL W. KELSEY, OF RED LODGE, MONTANA.

ADJUSTABLE MILKING-STOOL.

1,318,288. Specification of Letters Patent. Patented Oct. 7, 1919.

Application filed February 20, 1918. Serial No. 218,258.

*To all whom it may concern:*

Be it known that I, SAMUEL W. KELSEY, a citizen of the United States, residing at Red Lodge, in the county of Carbon and State of Montana, have invented certain new and useful Improvements in Adjustable Milking-Stools; and I do hereby declare the following to be a full, clear, and exact description of the invention, such as will enable others skilled in the art to which it appertains to make and use the same.

The invention relates to an adjustable milking stool.

The object of the present invention is to improve the construction of milking stools and to provide a simple, practical and efficient milking stool of strong, durable and comparatively inexpensive construction capable of ready adjustment to arrange the seat at the desired height and adapted to be securely fastened in such adjustment.

With these and other objects in view, the invention consists in the construction and novel combination of parts hereinafter fully described, illustrated in the accompanying drawing and pointed out in the claim hereto appended; it being understood that various changes in the form, proportion, size and minor details of construction, within the scope of the claim, may be resorted to without departing from the spirit or sacrificing any of the advantages of the invention.

In the drawing:

Figure 1 is an elevation of a milking stool constructed in accordance with this invention.

Fig. 2 is an enlarged vertical sectional view of the upper portion of the standard and the adjusting means for securing the stem and the seat in their adjustment.

Fig. 3 is a horizontal sectional view through the same.

Like numerals of reference designate corresponding parts in all the figures of the drawing.

In the accompanying drawing, in which is illustrated the preferred embodiment of the invention, the milking stool comprises in its construction a standard 1 provided at its lower end with a foot or enlargement 2 and preferably consisting of a tube and receiving a tubular nut 3 within its upper portion. The tubular nut 3 is provided at the upper end with an annular horizontally projecting flange which rests upon the upper edges of the tubular standard and the threads 5 of the tubular nut engage with a threaded portion 6 of a stem 7. The stem 7 carries a seat 8 which is provided with a socket 9 secured to the seat 8 by a spider 10. The threaded portion of the stem is flattened or cut away at 11 at one side to provide a flat face for engagement by a locking screw 12 which engages threaded openings 13 and 14 of the tubular standard and the tubular nut.

The tubular nut is shown provided at its exterior with projecting lugs 15 which fit against the interior of the tubular standard and space the nut slightly from the inner face of the said standard, but the tubular nut may be provided with a close fit if desired, and the threaded engagement of the locking screw with the tubular stem and with the nut will scure the nuts against rotary movement and will also maintain the stem in fixed adjustment with the nut and the standard. When the screw is withdrawn from abutting engagment with the flat face of the stem, the latter is adapted to be rotated to raise or lower the seat and after the seat has been properly adjusted, the screw is reëngaged with the flat face of the stem and the parts will be firmly held in their adjusted positions, as clearly illustrated in Fig. 3 of the drawing. The entire stem and the tubular nut may be readily removed from the standard 1 by withdrawing the locking nut or bolt 12 from engegement with the tubular nut 3.

What is claimed is:

A stool including a tubular standard, a tubular nut arranged within the standard and provided with an annular flange engaging the top of said standard, a stem having threaded engagement with said tubular nut and being flattened on one side thereof, said tubular nut and said standard having alining screw threaded openings, a locking screw extended through the opening in said tubular standard and said tubular nut and adapted to engage the flattened side of said stem for locking the same, said locking screw being adapted to be withdrawn from said tubular nut to permit of the ready removal of the stem and tubular nut, and a seat secured to said stem.

In testimony whereof I affix my signature in presence of two witnesses.

SAMUEL W. KELSEY.

Witnesses:
 WM. LARKIN,
 HARRY P. CASSIDY.